United States Patent
Noda et al.

(10) Patent No.: US 7,957,620 B2
(45) Date of Patent: Jun. 7, 2011

(54) TWO-DIMENSIONAL PHOTONIC CRYSTAL RESONATOR

(75) Inventors: Susumu Noda, Kyoto (JP); Takashi Asano, Kyoto (JP); Bong-Shik Song, Kyoto (JP); Yoshihiro Akahane, Hyogo (JP)

(73) Assignees: Kyoto University, Kyoto (JP); Sumitomo Electric Industries, Ltd., Osaka (JP)

( * ) Notice: Subject to any disclaimer, the term of this patent is extended or adjusted under 35 U.S.C. 154(b) by 876 days.

(21) Appl. No.: 10/569,729

(22) PCT Filed: Aug. 24, 2004

(86) PCT No.: PCT/JP2004/012115
§ 371 (c)(1),
(2), (4) Date: Sep. 11, 2007

(87) PCT Pub. No.: WO2005/022220
PCT Pub. Date: Mar. 10, 2005

(65) Prior Publication Data
US 2007/0297722 A1 Dec. 27, 2007

(30) Foreign Application Priority Data

Aug. 29, 2003 (JP) .................................. 2003-307655
Mar. 4, 2004 (JP) .................................. 2004-061147

(51) Int. Cl.
*G02B 6/122* (2006.01)
*G02B 6/26* (2006.01)
(52) U.S. Cl. ............... 385/129; 305/27; 305/31; 305/50
(58) Field of Classification Search .................... 385/27, 385/31, 39, 48, 50, 129–132
See application file for complete search history.

(56) References Cited

U.S. PATENT DOCUMENTS
7,242,837 B2 * 7/2007 Talneau et al. ................ 385/129

FOREIGN PATENT DOCUMENTS
JP 2001-272555 10/2001
(Continued)

OTHER PUBLICATIONS

Sato et al., "28a-FZ-5 Hetero Kozo photonic Kessho ni yoru Kinosei Doharo Chip no Sekkei to Hyoka", 2002 Nen Shunki Dai 49 Kai Oyo Butsurigaku Kankei Rengo Koenkai Koen Bunsatsu, pp. 1029.

(Continued)

*Primary Examiner* — Brian M. Healy
*Assistant Examiner* — Michael P Mooney
(74) *Attorney, Agent, or Firm* — McDermott Will & Emery LLP

(57) ABSTRACT

The present invention intends to provide a two-dimensional photonic crystal resonator having a high Q-value. The slab-shaped body 21 is provided with cyclically arranged holes 22. The body 21 is divided into three areas 31-33 with the holes 22 arranged with cycle distances of $a_1$ in area 31 and $a_2$ in areas 32 and 33, which is smaller than $a_1$. A waveguide 23 passing through the three areas is formed by linearly eliminating the holes 22. The waveguide 23 thus formed can propagate rays of light within a wavelength band that depends on the cycle distance of the holes 22. The cycle distance of the holes in the area 31 differs from that of the areas 32 and 33, and the wavelength band of the light propagating through the waveguide accordingly differs. Therefore, a ray of light whose wavelength is within the waveguide transmission wavelength band of the area 31 but outside of the waveguide transmission wavelength band of the other areas 32 and 33 will be confined within the waveguide of the area 31 and resonate therein. Thus, the waveguide in the area 31 functions as a resonator.

10 Claims, 7 Drawing Sheets

FOREIGN PATENT DOCUMENTS

| | | |
|---|---|---|
| JP | 2003-131028 | 5/2003 |
| WO | WO 03/044579 A2 * | 5/2003 |
| WO | WO 2004/053549 A1 | 6/2004 |

OTHER PUBLICATIONS

So et al., "29a-YN-4 Mennai Hetero Kozo no Kyokaimen o Mochiita Hacho Gobunha Koritsu no Kojo", 2003 Nen Shunki Dai 50 Kai Oyo Butsutigaku Kankei Rengo Koenkai Koen Yokoshu, Mar. 27, 2003, Dai 3 Bunsatsu, pp. 1137.

Song et al., "Photonic Devices Based on In-Plane Hetero Photonic Crystals", Science, vol. 300, Jun. 6, 2003, pp. 1537.

Asano et al., "1p-ZM-11 2-Jigen Photonic Kessho Slab no Bisho Double Hetero Setsugo o Mochiita Ko-Q kekkan Kyoshinki", 2003 Nen Shuki Dai 64 Kai Oyo Butsuri Gakkai Gakujutsu Koenkai Koen Yokoshu, Aug. 30, 2003, Dai 3 Bunsatsu, pp. 946.

Noda et al., "Tu-E6 In-Plane Hetero Photonic Crystals", Technical Digest of International Symposium on Photonic and Electromagnetic Crystal Structures V.(PEC-V), Mar. 7, 2004, pp. 86, Fig. 2.

* cited by examiner (a)

(b)

TWO-DIMENSIONAL PHOTONIC CRYSTAL RESONATOR

This application is the U.S. National Phase under 35 U.S.C. §371 of International Application No. PCT/JP2004/012115, filed Aug. 24, 2004, which in turn claims the benefit of Japanese Application No. 2003-307655, filed Aug. 29, 2003 and Japanese Application No. 2004-061147, filed Mar. 4, 2004, the disclosures of which Applications are incorporated by reference herein in their entirety.

TECHNICAL FIELD

The present invention relates to a two-dimensional photonic crystal applicable for an optical multiplexer/demultiplexer, or similar devices, used in wavelength division multiplexing communication or other technologies. Particularly, it relates to a resonator for producing the resonance of a ray of light having a specified wavelength.

BACKGROUND ART

Recently, photonic crystals have been drawing attention as an optical functional material. A photonic crystal is characterized in that its cyclic structure forms a band structure with respect to the energy of light or electromagnetic waves, thereby creating an energy region (called the photonic bandgap) that forbids the propagation of light or electromagnetic waves. It should be noted that this specification uses the term "light" or "optical" as inclusive of electromagnetic waves.

Introduction of an appropriate defect into the photonic crystal will create an energy level (called the defect level) within the photonic bandgap. This allows only a specific wavelength of light having an energy corresponding to the defect level to exist there within the wavelength (or frequency) range corresponding to the energy levels included in the photonic bandgap. Forming a linear defect will provide a waveguide, and forming a point-like defect in the crystal will provide an optical resonator. The resonance wavelength, i.e. the wavelength of light that resonates at the point-like defect, depends on the shape and refractive index of the defect.

Using such resonators and waveguides, research has been conducted to manufacture various types of optical devices. For example, the resonator can be located in proximity to the waveguide to create an optical multiplexer/demultiplexer capable of functioning as the following two devices: an optical demultiplexer for extracting a ray of light whose wavelength equals the resonance wavelength of the resonator from rays of light having different wavelengths and propagating through the waveguide, and for emitting the extracted light through the resonator to the outside; and an optical multiplexer for trapping a ray of light having the resonance wavelength of the resonator from the outside, and for introducing the trapped light through the resonator into the waveguide. Such an optical multiplexer/demultiplexer can be used, for example, in the field of optical communications for wavelength division multiplexing communication in which rays of light having different wavelengths are propagated through a single waveguide, with each ray of light carrying a different signal.

Photonic crystals can be created from both two-dimensional and three-dimensional crystals, of which two-dimensional crystals are advantageous in that they are relatively easy to manufacture. For example, Patent Document 1 discloses a two-dimensional photonic crystal and an optical multiplexer/demultiplexer, each of which includes a two-dimensional photonic crystal consisting of a plate (or slab) with a high refractive index and including a cyclic array of a material whose refractive index is lower than that of the material of the plate, where a waveguide is formed by linearly eliminating the cyclic array and a point-like defect (or a resonator) that disorders the cyclic array is formed in proximity to the waveguide. The cyclic array of the low refractive index material is formed by cyclically creating holes in the slab.

[Patent Document 1] Japanese Unexamined Patent Publication No. 2001-272555 (paragraphs 0019-0032, 0055 and 0056; FIGS. 1, 22 and 23)

For a resonator utilizing the above-described two-dimensional photonic crystal, it is essential to make its Q-value as high as possible. Q-value is an index for the performance of a resonator, and a higher Q-value means a smaller amount of light leaking from the resonator to the outside. An increase in the Q-value of a resonator also means an improvement in the accuracy of an optical multiplexer/demultiplexer using the resonator as well as an improvement in the performance of the resonator itself. Specifically, in an optical multiplexer/demultiplexer, a larger Q-value of the resonator yields a higher wavelength resolution and thereby decreases the possibility that the noise components of light whose wavelengths differ from the resonance wavelength are multiplexed or demultiplexed, so that the multiplexing/demultiplexing accuracy improves.

In general, however, Q-values of two-dimensional crystals are lower than those of three-dimensional crystals because the light-confining effect of two-dimensional crystals is weak in the direction perpendicular to the slab face. In the optical multiplexer/demultiplexer disclosed in Patent Document 1, the Q-value of the resonator is approximately 500, and the full width at the half maximum of the spectrum of the light multiplexed or demultiplexed through the resonator is about 3 nm. These values are insufficient for high-density wavelength division multiplexing optical communication; the desired values are 0.8 nm or smaller in wavelength resolution and 2000 or larger in Q-value. Thus, it is desired to realize a two-dimensional photonic crystal resonator having a still higher Q-value.

DISCLOSURE OF THE INVENTION

Problem to be Solved by the Invention

Thus, an object of the present invention is to provide a new type of two-dimensional photonic resonator having a high level of Q-value, as well as a multiplexer/demultiplexer using such a resonator.

Means for Solving the Problems

To solve the aforementioned problem, a two-dimensional photonic crystal resonator according to the present invention is characterized in that it includes:

a) a first area consisting of a two-dimensional photonic crystal with a waveguide having a first transmission wavelength band;

b) a second area located adjacent to the first area and consisting of a two-dimensional photonic crystal with a waveguide connected to the waveguide of the first area and having a second transmission wavelength band; and c) a third area located adjacent to the first area and consisting of a two-dimensional photonic crystal with a waveguide connected to the waveguide of the first area and having a third transmission wavelength band;

where a segment of the first transmission wavelength band is located outside both the second transmission wavelength band and the third transmission wavelength band so that light present within the waveguide of the first area is reflected by the boundaries with the second area and the third area and made to resonate.

A two-dimensional photonic crystal resonator according to another mode of the present invention is characterized in that it includes:

a) a first area consisting of a two-dimensional photonic crystal with a waveguide having a first transmission wavelength band; and b) a second area surrounding the first area and consisting of a two-dimensional photonic crystal with a waveguide connected to both ends of the waveguide of the first area and having a second transmission wavelength band, where a segment of the first transmission wavelength band is located outside the second transmission wavelength band so that light present within the waveguide of the first area is reflected by two boundaries with the second area and made to resonate.

Specifically, it is preferable to construct the above two-dimensional photonic crystal resonators as follows:

The two-dimensional photonic crystal resonator according to the first mode of the present invention is characterized in that it includes:

a) a first area consisting of a two-dimensional photonic crystal having a first cycle distance;

b) a second area and a third area, each being located adjacent to the first area and consisting of a two-dimensional photonic crystal, which have a second cycle distance and a third cycle distance, respectively, that are different from the first cycle distance; and c) a waveguide passing through the second area, the first area and the third area in this order, where light present within the first area is reflected by the boundaries with the second area and the third area and made to resonate.

The two-dimensional photonic crystal resonator according to the second mode of the present invention is characterized in that it includes:

a) a first area consisting of a two-dimensional photonic crystal having a first cycle distance;

b) a second area surrounding the first area and consisting of a two-dimensional photonic crystal having a second cycle distance different from the first cycle distance, and c) a waveguide passing through the second area, the first area and the second area in this order, where light present within the first area is reflected by two boundaries with the second area and made to resonate.

The two-dimensional photonic crystal resonator according to the third mode of the present invention is characterized in that it includes:

a) a slab-shaped body;

b) a first area created in the body by cyclically arranging modified refractive index areas having a predetermined size and a refractive index that differs from that of the body;

c) a second area and a third area, each being located adjacent to the first area, which are created by cyclically arranging modified refractive index areas having a predetermined size that differs from that of the modified refractive index areas present in the first area; and d) a waveguide passing the second area, the first area and the third area in this order, where light present within the first area is reflected by the boundaries with the second area and the third area and made to resonate.

The two-dimensional photonic crystal resonator according to the fourth mode of the present invention is characterized in that it includes:

a) a slab-shaped body;

b) a first area created in the body by cyclically arranging modified refractive index areas having a predetermined size and a refractive index that differs from that of the body;

c) a second area surrounding the first area, which is created by cyclically arranging modified refractive index areas having a predetermined size that differs from that of the modified refractive index areas present in the first area; and d) a waveguide passing the second area, the first area and the second area in this order, where light present within the first area is reflected by two boundaries with the second area and made to resonate.

In the two-dimensional photonic crystal resonators according to the first and second modes of the present invention, it is preferable to make the first cycle distance larger than the other cycle distance or cycle distances. Here, the term "other cycle distance or cycle distances" stands for the second cycle distance and the third cycle distance in the first mode or the second cycle distance in the second mode. In the two-dimensional photonic crystal resonators according to the third and fourth modes of the present invention, it is preferable to make the size of the modified refractive index area present in the first area smaller than that of the modified refractive index area present in the other area or areas.

A two-dimensional photonic crystal resonator according to the present invention minimally includes a first area, and the second and third areas are each located adjacent to the first area. A waveguide is formed in each of the first through third areas. The waveguide can be formed by disordering the cyclic structure within a linear zone in each area. The waveguide of the second area and the waveguide of the third area are separately connected to the waveguide of the first area. Namely, a waveguide that passes the second area, the first area and the third area in this order is formed.

The wavelength band within which light is allowed to pass through the waveguide (i.e. the transmission wavelength band) can be appropriately determined by regulating parameters including the cycle distance of the two-dimensional crystal, the size, shape and material of the member constituting the cyclic structure, and the width and material of the waveguide. According to the present invention, a segment of the transmission wavelength band of the waveguide of the first area (i.e. the first transmission wavelength band) is located outside the transmission wavelength bands of the second and third areas (i.e. the second transmission wavelength band and the third transmission wavelength band). The light within this segment of the wavelength band will resonate in the resonator according to the present invention, which will be described later. Such a segment of the wavelength band is called the "resonance wavelength band" hereinafter.

As shown in FIG. 1(a), the second transmission wavelength band 12 and the third transmission wavelength band 13 are formed on the short wavelength side of the first transmission wavelength band 11 (indicated by the thick frame) to create a resonance wavelength band 111a (indicated by the shaded area) on the long wavelength side of the first transmission wavelength band 11. Conversely, as shown in FIG. 1(b), the second transmission wavelength band 12 and the third transmission wavelength band 13 may be formed on the long wavelength side of the first transmission wavelength band 11 to create a resonance wavelength band 111b on the short wavelength side of the first transmission wavelength band 11.

This two-dimensional crystal resonator functions as follows: The above-described setting of the first through third transmission wavelength bands allows light having a wavelength within the resonance wavelength band to propagate through the waveguide of the first area but forbids the same light to propagate through the waveguides of the second and third areas. Therefore, if a ray of light having the aforementioned wavelength is present within the waveguide of the first area, the light is reflected by the boundary between the first area and the second area as well as the boundary between the first area and the third area. Thus, the waveguide of the first area functions as a resonator.

In the two-dimensional photonic crystal resonator according to the present invention, the two areas located adjacent to the first may be replaced by a second area surrounding the first area. In this case, the waveguide of the second area should connect to both ends of the waveguide of the first area. Namely, a waveguide that passes the second area, the first area and again the second area in this order is formed. As in the previous case, a segment of the transmission wavelength band of the wavelength of the first area is located outside the transmission wavelength band of the waveguide of the second area. In this construction, light present within the waveguide of the first area is reflected by two boundaries with the waveguide of the second area and made to resonate.

The resonance wavelength band can be determined by regulating the cycle distance of the two-dimensional photonic crystal, the size of the modified refractive index area constituting the cyclic structure, and other parameters. The following paragraphs describe four modes of the two-dimensional photonic crystal resonators constructed by regulating the resonance wavelength band as described above. The first and second modes regulate the cycle distance, and the third and fourth modes regulate the size of the modified refractive index area.

The first mode of the two-dimensional photonic crystal resonator is described.

In this mode, the two-dimensional photonic crystal resonator has a first area, a second area and a third area, and the second and third areas are each located adjacent to the first area. The first, second and third areas have the first, second and third cycle distances, respectively. The value of the second cycle distance differs from that of the first, and the value of the third cycle distance also differs from that of the first. The presence of the cycle distance of each area leads to a photonic bandgap formed in the area. Accordingly, any light whose wavelength within the photonic bandgap is excluded from the photonic crystal.

A waveguide passes through the three areas: the second area, the first area and the third area, in this order. The waveguide transmission wavelength band depends on the cycle distance of each area. As a result, a segment of the waveguide transmission wavelength band of the first area is located outside the waveguide transmission wavelength bands of the second area and the third area.

The waveguide can be formed by disordering the cyclic structure within a linear zone in each area. Within such a linear zone, any ray of light whose wavelength falls within a segment of the wavelength range of the photonic bandgap is allowed to exist and, accordingly, the light within the segment of the wavelength range can propagate. The waveguide thus formed is capable of propagating light whose wavelength falls within the transmission wavelength band but incapable of propagating light whose wavelengths are outside the transmission wavelength band. An increase in the cycle distance of the two-dimensional photonic crystal causes a shift of the transmission wavelength band toward the long wavelength side. Therefore, it is possible to form a resonance wavelength band $111a$ located on the long wavelength side within the first transmission wavelength band 11 (indicated by the thick frame) and outside the second and third transmission wavelength bands by setting the first cycle distance larger than each of the second cycle distance and the third cycle distance, as shown in FIG. 1($a$). Conversely, it is also possible to form a resonance wavelength band $111b$ located on the short wavelength side within the first transmission wavelength band 11 and outside the second and third transmission wavelength bands by setting the first cycle distance smaller than each of the second cycle distance and the third cycle distance, as shown in FIG. 1($b$).

The first mode of the two-dimensional photonic crystal can function as a resonator, as follows: When a ray of light having a wavelength within the resonance wavelength band is present within the waveguide of the first area, the light cannot propagate through the second area and the third area. It is because the light is outside the waveguide transmission wavelength bands of the second area and the third area. Therefore, the light is reflected by the boundary between the first area and the second area as well as the boundary between the first area and the third area. Thus, the light resonates within the waveguide of the first area, which means that the waveguide of the first area functions as a resonator.

In some cyclic structure of the two-dimensional photonic crystal, a wavelength band in which light leaks from the crystal surface to the outside may be formed within the aforementioned segment of the waveguide transmission wavelength band. The present invention should preferably prevent such a leaky wavelength band from being formed within the resonance wavelength band. For example, suppose a two-dimensional photonic crystal in which a material whose refractive index differs from that of the body of the crystal is arranged in a triangular lattice pattern. In this type of crystal, if a waveguide is formed by linearly eliminating the aforementioned material, a wavelength band in which light leaks from the crystal surface to the outside will be formed on the short wavelength side of the waveguide transmission wavelength band. In this case, if the first cycle distance is smaller than both the second cycle distance and the third cycle distance, the light in the resonance wavelength band $111b$ shown in FIG. 1($b$) will leak from the resonator to the outside of the crystal surface. In contrast, such a leakage will never occur in the case of FIG. 1($a$). Therefore, in the above example of the two-dimensional photonic crystal, it is preferable to set the first cycle distance larger than the second cycle distance and the third cycle distance.

The second mode of the two-dimensional crystal resonator is described.

This resonator has a first area consisting of a two-dimensional photonic crystal having a first cycle distance and a second area surrounding the first area and consisting of a two-dimensional photonic crystal having a second cycle distance that differs from the first cycle distance. It also has a waveguide that passes through the second area, the first area, and again the second area in this order. Therefore, the waveguide of the first area is connected to the second area at both ends. Since the first cycle distance is different from the second cycle distance, a segment of the waveguide transmission wavelength band of the first area is located outside the second area and, accordingly, a resonance wavelength band is formed in the waveguide of the first area.

In the second mode of the two-dimensional photonic crystal, the waveguide of the first area functions as a resonator due to the same reason as applied to the first mode. Namely, if a ray of light whose wavelength is within the resonance wavelength band is present in the first area, the light is reflected by both ends of the waveguide of the first area and resonates.

In the vicinity of the wavelength corresponding to the boundary between the resonance wavelength band and the transmission wavelength band of either the second or third area, a portion of the light leaks from the waveguide of the first area to the waveguide of the second or third area. To create a wavelength band free of such a leakage, the resonance wavelength band may preferably have a width larger than a certain value. For this purpose, in the first and second modes, it is desirable to make the difference between the first cycle distance and the other cycle distance or cycle distances equal to or larger than 0.1%. Meanwhile, it is necessary to form the first transmission wavelength band or both the second and third transmission wavelength bands within the photonic bandgap. In the first and second modes, the transmission wavelength bands of all the areas will be within the photonic bandgap by setting the difference between the first cycle distance and the other cycle distance or cycle distances equal to or smaller than 10%.

In the two-dimensional photonic crystal resonators of the first and second modes, the cycle distance of each area can be typically determined by enlarging or reducing the two-dimensional photonic crystal within a plane. It is also possible to carry out the enlarging or reducing operation only in a specific direction within the plane. The inventors of the present application have conducted a calculation using the finite difference time domain method (FDTD method) and proved that it is possible to improve the Q-value by carrying out the enlarging or reducing operation only in a direction parallel to the waveguide and not in the direction perpendicular to the waveguide. In this case, it is possible to increase or decrease the width of the waveguide according to the increase or decrease in the cycle distance. However, for the Q-value to be higher, the widening or narrowing of the waveguide should be avoided; the width of the waveguide should be preferably equal to that of the other area.

The third and fourth modes of the two-dimensional photonic crystal resonators are described.

These two-dimensional photonic crystal resonators use a two-dimensional photonic crystal created by providing the slab-shaped body with a cyclic arrangement of a modified refractive index area, i.e. an area whose refractive index differs from that of the slab-shaped body. In the third mode, the second area and the third area are located adjacent to the first area. In the fourth mode, the second area is formed so that it surrounds the first area. In these modes, the size of the modified refractive index area in the first area is made to differ from that of the other area or areas. Moreover, a waveguide passing through each area is formed, as in the case of the first and second modes.

In forming a waveguide in the two-dimensional photonic crystal, a reduction in the size of the modified refractive index area will shift the transmission wavelength band of the waveguide toward the long wavelength side. Using this shift, the transmission wavelength bands 11-13 and the resonance wavelength band 111a or 111b, shown in FIGS. 1(*a*) or 1(*b*), can be formed so as to make the waveguide of the first area function as a resonator, as described previously. Also, since FIG. 1(*a*) is more preferable than FIG. 1(*b*) as explained earlier, it is preferable to make the modified refractive index area of the first area smaller than that of the other area or areas.

In any of these photonic crystal resonators, a slight difference in cycle distance or size of the modified refractive index area between the first area and the other area or areas leads to a moderate but 100% reflection of the light having the resonance wavelength to occur at their boundaries (though leakage is unavoidable to some extent). This moderates the change in the strength of light along the longitudinal direction of the waveguide, which resultantly enhances the light-confining effect in the anti-plane direction. This confining effect enables the two-dimensional photonic crystal resonators according to the present invention to have high Q-values. Particularly, if the two-dimensional photonic crystal has a cyclic arrangement of holes formed in a slab-shaped body to provide the cyclic structure of each area and a waveguide formed by linearly eliminating the holes, the Q-value of the resonator according to the present invention will be hundreds to thousands of times as high as that of conventional resonators using point-like defects.

Though the cycle distances (for the first and second modes) or the sizes of the modified refractive index area (for the third and fourth modes) of the second area and the third area may be different, it is preferable to make the two values equal so as to improve the symmetry of the crystal.

To further moderate the change in the strength of light along the longitudinal direction of the waveguide and thereby improve the light-confining effect in the anti-plane direction, in the first and second modes of the two-dimensional photonic crystal resonators, it is preferable to provide an area or areas between the first area and the second area whose cycle distance is between the first cycle distance and the second cycle distance, and also provide an area or areas between the first area and the third area whose cycle distance is between the first cycle distance and the third cycle distance. Similarly, in the third and fourth modes, it is preferable to provide an area or areas between the first area and the other area or areas including a cyclic arrangement of modified refractive index areas whose size is between that of the modified refractive index area of the first area and that of the modified refractive index area of the other area or areas. Plural pieces of such areas may be formed between the first area and the second area as well as between the first area and the third area. The addition of such an area will reduce the difference in cycle distance or size of the modified refractive index area between adjacent areas, so that the reflection of the light having the resonance wavelength at each boundary will be more moderate. Thus, the light-confining effect in the anti-plane direction is further improved.

Forming another waveguide (i.e. an input/output waveguide) in proximity to the resonator in the waveguide of the first area will create an optical multiplexer/demultiplexer that extracts a ray of light whose wavelength equals the resonance wavelength of the resonator from the input/output waveguide where various wavelengths of light superimposed with each other (i.e. superimposed light) are propagated and emits the extracted light via the resonator to the outside, or that introduces a ray of light having the resonance wavelength of the resonator from the outside via the resonator into the input/output waveguide. Forming two input/output waveguides across the resonator in the waveguide of the first area makes it possible to extract a ray of light whose wavelength equals the resonance wavelength of the resonator from the superimposed light propagating through one input/output waveguide and emit the extracted light via the resonator to the other input/output waveguide, or to introduce a ray of light whose wavelength equals the resonance wavelength of the resonator from one input/output waveguide via the resonator into the other input/output waveguide. In the case of multiplexing or demultiplexing light between two input/output waveguides, it is possible to create a point-like defect whose resonance wavelength equals the aforementioned wavelength in proximity to the input/output waveguide so that the light multiplexed or demultiplexed at the input/output waveguide is extracted or introduced between the point-like defect and the outside of the crystal. In this case, in order to allow the light having the resonance wavelength of the resonator to pass through the input/output waveguide, the width of the input/output waveguide should differ from that of the waveguide to which the resonator belongs.

Designing the input/output waveguide and the waveguide to which the resonator belongs with different widths as described above will narrow the waveguide transmission wavelength band shared by the aforementioned waveguides and thereby suppress the crosstalk, i.e. the extraction or introduction of rays of light having wavelengths different from the resonance wavelength between the waveguides. The crosstalk can be also suppressed by bending the input/output waveguide so that the displacement of the waveguide from the resonator increases as the distance from the resonator increases.

In the two-dimensional photonic crystal according to the present invention, it is possible to add a luminescent medium to an area including at least the waveguide of the first area to make the resonator in the waveguide of the first area function as a light source. An example of the luminescent medium is InGaAsP.

EXPLANATION OF NUMERALS 11, 12, 13 . . . Waveguide Transmission Wavelength Band
111a, 111b . . . Resonance Wavelength Band
21 . . . Body
22, 961, 962, 963 . . . Hole
23, 24, 25, 26, 75, 97 . . . Waveguide
231, 241, 251, 252, 261, 76, 98 . . . Resonator
31, 41, 51, 71, 91 . . . First Area
32, 42, 52, 72, 92 . . . Second Area
33, 43, 53, 73, 93 . . . Third Area
54, 745, 94 . . . Fourth Area
55, 746, 95 . . . Fifth Area
61 . . . Point-Like Defect
741, 742, 743, 744 . . . Intermediate Area
81, 82, 83 . . . Input/Output Waveguide

BEST MODE FOR CARRYING OUT THE INVENTION

Figure 2:
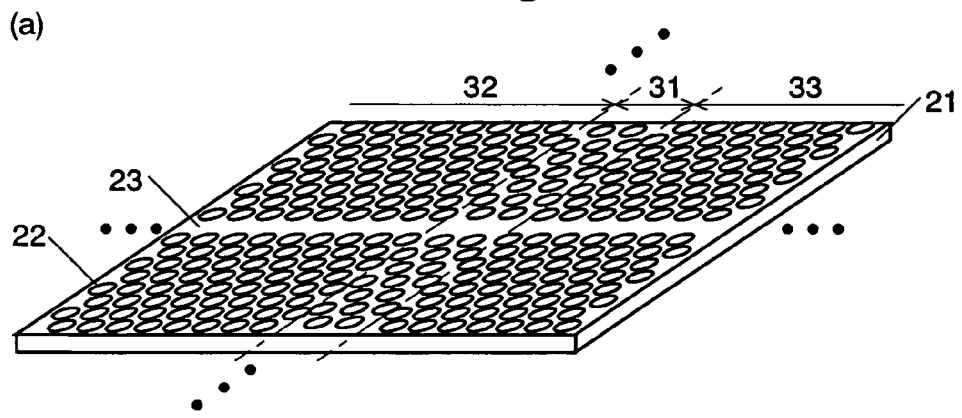
FIG. 2 includes a perspective view and a plan view of the first embodiment of the two-dimensional photonic crystal resonator according to the present invention.
Figure 2:
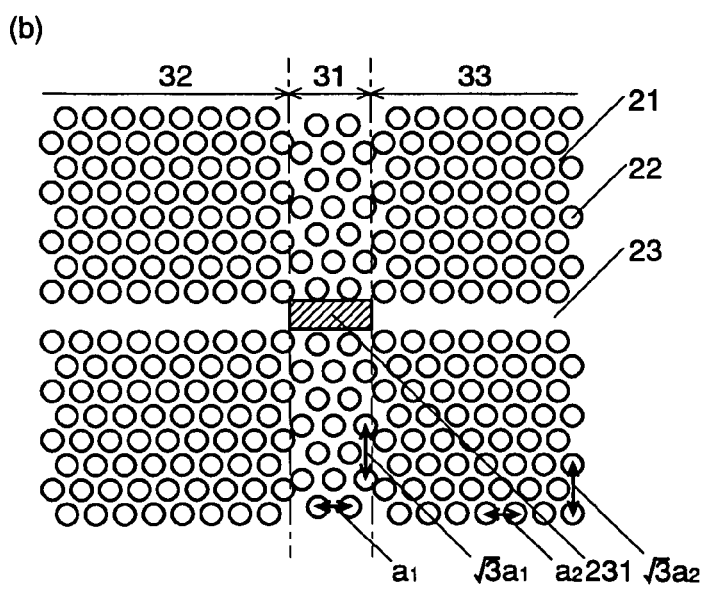

FIG. 2 shows a perspective view (a) and a plan view (b) of the first embodiment of the two-dimensional photonic crystal resonator according to the present invention. The slab-shaped body 21 has holes 22 cyclically arranged in a triangular lattice pattern. The body 21 consists of three areas, where the first area 31 is located between the second and third areas 32 and 33. In the present embodiment, the cycle distance of the holes 22 in both the second area 32 and the third area 33 is $a_2$, whereas the cycle distance of the holes 22 in the first area 31 is $a_1$, which is larger than $a_2$. A waveguide 23 is formed so that it passes through the first area 31, the second area 32 and the third area 33. The waveguide 23 is created by eliminating the holes 22 lying on a single line of the lattice points of the triangular lattice, or by forming a zone devoid of the holes 22.

Figure 3:
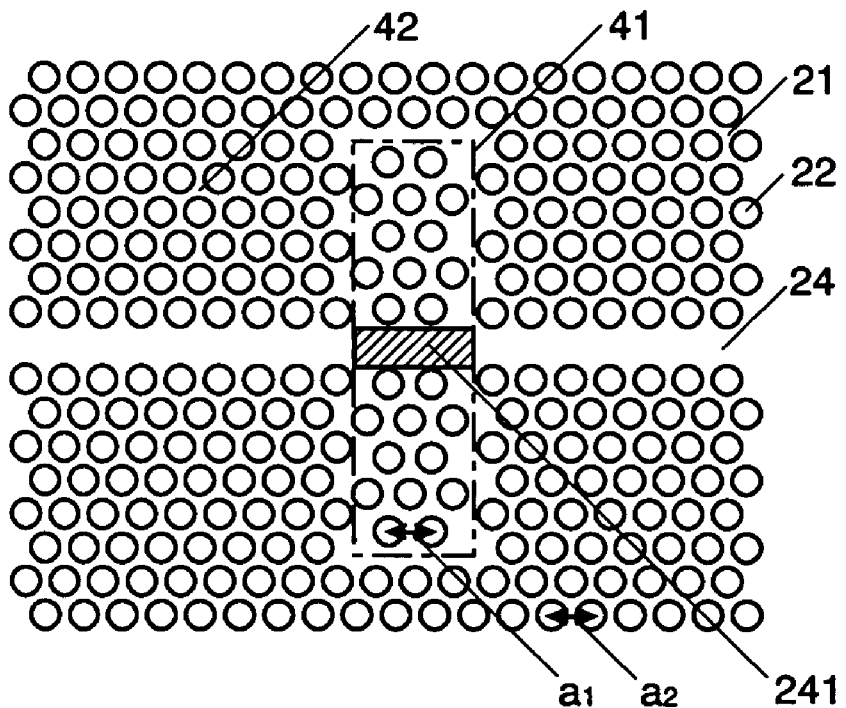
FIG. 3 is a plan view of the second embodiment of the two-dimensional photonic crystal resonator according to the present invention.

FIG. 3 is a plan view of the second embodiment of two-dimensional photonic crystal resonator according to the present invention. This embodiment corresponds to the second mode described earlier. The cycle distances of the holes 22 in the first area 41 and the second area 42 are $a_1$ and $a_2$, respectively, where $a_1 > a_2$. A waveguide 24 is formed so that it passes through the second area 42, the first area 41 and again the second area 42 in this order. This waveguide 24 can be created in the same manner as described previously.

Figure 1:
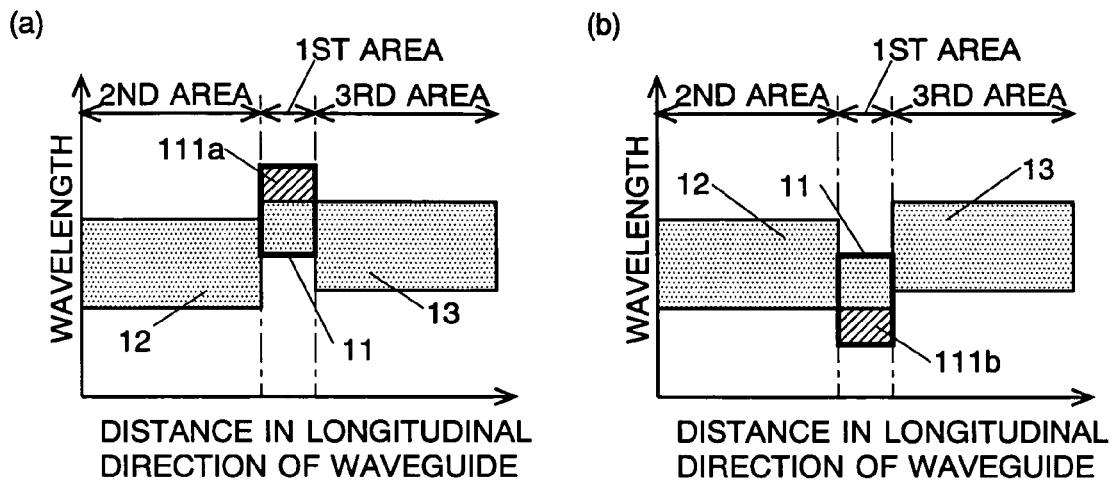
FIG. 1 includes drawings for explaining the resonance wavelength band in the two-dimensional photonic crystal resonator according to the present invention.

Next, the function of the two-dimensional photonic crystal resonators of the above two embodiments is described. The following description refers solely to the first embodiment; the resonators of the two embodiments function in the same manner. Since the cycle distance of the holes of the first area 31 is larger than that of the second area 32 and the third area 33, the waveguide transmission wavelength band of the first area includes a resonance wavelength band 111a, as shown in FIG. 1. If a ray of light whose wavelength is within the wavelength band is introduced, for example, from the crystal surface into the part 231 of the waveguide 23 included in the first area 31 (indicated by the shadowed section in FIG. 2), the light cannot propagate through the second area 32 and the third area 33 but is reflected by the boundaries between these areas, i.e. by both ends of the waveguide 231, and resonates in the waveguide 231. Thus, the waveguide 231 functions as a resonator. It is also possible to make the waveguide 231 function as a light source by manufacturing a portion of the body 21 including the waveguide 231, or the entire body 21, from a material containing a luminescent medium, such as InGaAsP.

Figure 4:
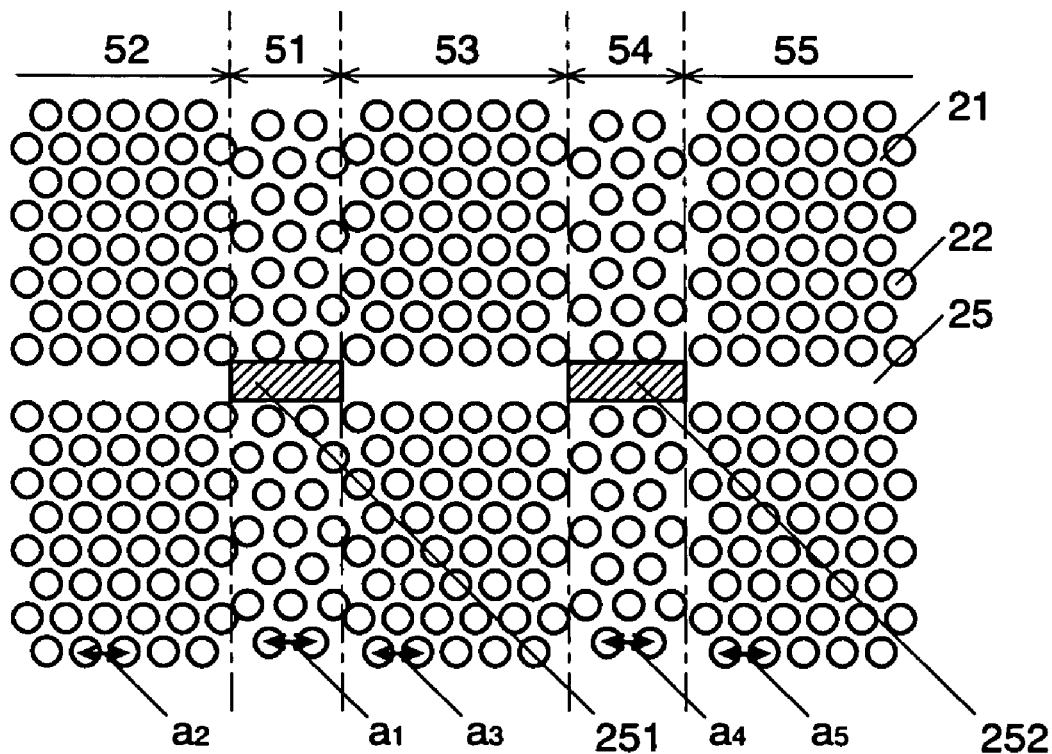
FIG. 4 is a plan view of another embodiment of the two-dimensional photonic crystal resonator according to the present invention.

FIG. 4 shows another possible construction, in which five areas (first through fifth areas 51-55) and a waveguide 25 passing through these areas are formed, where the cycle distances $a_1$ through $a_5$ of the holes in these areas satisfy the following conditions: $a_1 > a_2$, $a_1 > a_3$, $a_4 > a_3$ and $a_4 > a_5$. This design creates two resonators 251 and 252 located within the first area 51 and the fourth area 54, respectively. Naturally, it is possible to create three or more resonators in the same manner, or to apply the same design to other modes as well as the second mode to create two or more resonators.

Figure 5:
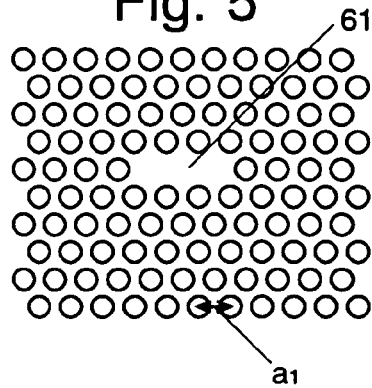
FIG. 5 is a plan view of a point-like defect resonator as a comparative example.

A calculation of the Q-value of the resonator formed as described above has been conducted by the FDTD method. The result is as follows:

First, as a comparative example, Q-value was calculated for a two-dimensional photonic crystal having holes arranged at regular cycle distance of $a_1$ as shown in FIG. 5, where the point-like defect 61 was formed by eliminating three holes 22 along a straight line. The result was Q=5,300.

Next, Q-value was calculated for the construction shown in FIG. 2 under each of the following conditions: (i) $a_1 = 1.023a_2$ and (ii) $a_1 = 1.0175a_2$. The results were (i) Q=530,000 and (ii) Q=1,000,000. These values are larger than one hundred times the Q-value of the point-like defect shown in FIG. 5.

In FIG. 2, the cycle distance of the holes is isotropically changed within the plane. Additionally, another construction shown in FIG. 6 was examined, in which the cycle distance of the holes in the direction perpendicular to the waveguide was basically the same ($3^{0.5}a_2$) among all the areas whereas the cycle distance was varied ($a_1$ and $a_2$) in the direction parallel to the waveguide. In this examination, the width of the waveguide was first set at the same value as in FIG. 2 (for this purpose, the holes located closest to the waveguide were shifted outwards by $(3^{0.5}/2) \times (a_1 - a_2)$, as indicated by the arrow 34 and Q-value was calculated under the following conditions relating to the cycle distance in the direction parallel to the waveguide: (iii) $a_1 = 1.023a_2$, (iv) $a_1 = 1.0175a_2$ and (v) $a_1 = 1.015a_2$. The results were (iii) Q=1,760,000, (iv) Q=3,100,000 and (v) Q=8,100,000. These values are several hundreds to one thousand times the Q-value of the conventional point-like defect.

Figure 6:
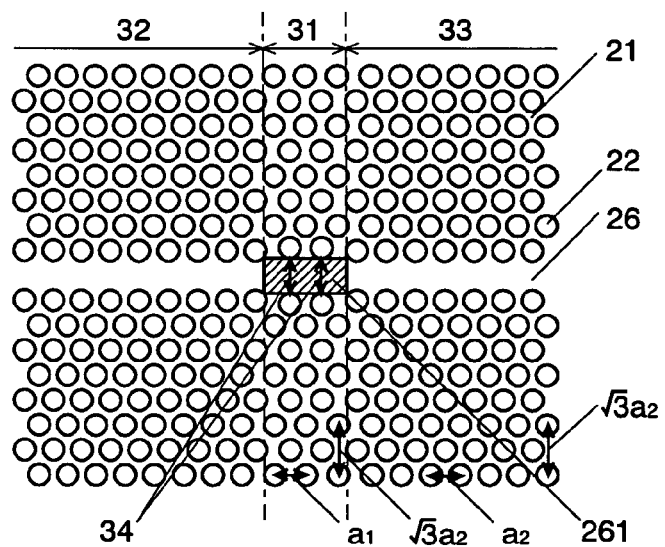
FIG. 6 is a plan view of an embodiment of the two-dimensional photonic crystal resonator according to the present invention, in which the cycle distance of the holes in the direction perpendicular to the waveguide is uniform among all the areas.
Figure 7:
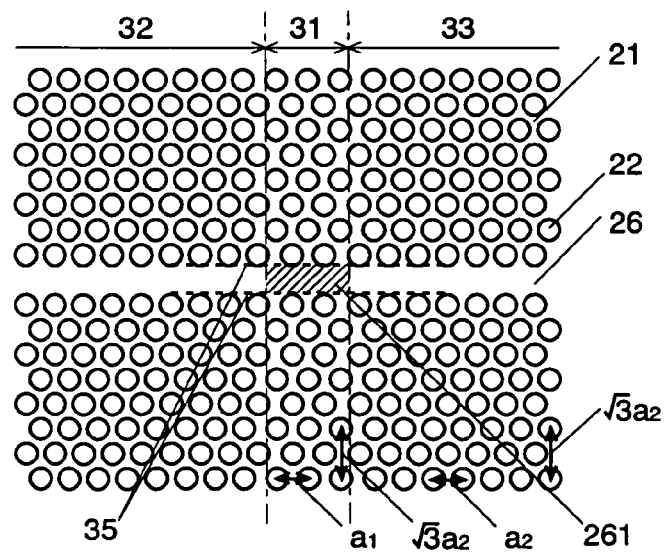
FIG. 7 is a plan view of an embodiment of the two-dimensional photonic crystal resonator according to the present invention, in which the width of the waveguide as well as the cycle distance of the holes in the direction perpendicular to the waveguide are uniform among all the areas.

Q-value was also calculated for another construction in which the width of the waveguide indicated by the broken lines 35 in FIG. 7 was uniform among all the areas ($3^{0.5}a_2 - b$, where b is the hole diameter) as well as the cycle distance of the holes in the direction perpendicular to the waveguide was uniform among all the areas. The Q-value was calculated under the condition of $a_1 = 1.024a_2$ ($a_1 = 420$ nm and $a_2 = 410$ nm). With the same parameters $a_1$ and $a_2$, the Q-value was 1,700,000 when the width of the waveguide was varied for each area as shown in FIG. 6, whereas the value increased to 2,400,000 when the width of the waveguide was equalized as described above.

Figure 8:
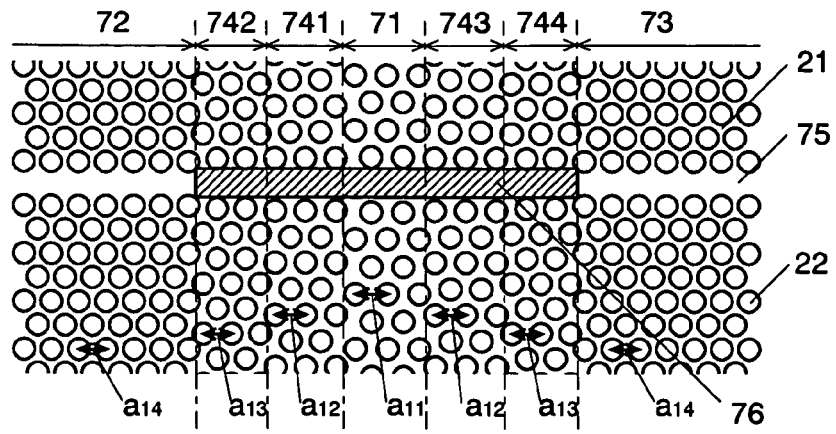
FIG. 8 is a plan view of an embodiment of the two-dimensional photonic crystal resonator having a multi-stage structure.

The following description focuses on a construction for enhancing the light-confining effect in the anti-plane direction by moderating the change in the strength of light along the longitudinal direction of the waveguide. FIG. 8 shows an embodiment of such a construction. In this embodiment, an intermediate area 741 having a cycle distance of $a_{12}$ and another intermediate area 742 having a cycle distance of $a_{13}$ are formed from the side of the first area 71 between the first area 71 having holes 22 arranged with a cycle distance of $a_{11}$ and the second area 72 having holes 22 arranged with a cycle distance of $a_{14}$. Similarly, an intermediate area 743 having a cycle distance of $a_{12}$ and another intermediate area 744 having a cycle distance of $a_{13}$ are formed from the side of the first area 71 between the first area 71 and the third area 73 having a cycle distance of $a_{14}$. The cycle distances $a_{11}$ through $a_{14}$ satisfy the relation $a_{11} > a_{12} > a_{13} > a_{14}$. Also, a waveguide 75 passing through all the areas are formed. Such a multi-stage structure of areas having different cycle distances makes the difference in the cycle distance of the holes 22 between adjacent areas smaller than that in the case where the first area 71 and the second area 72 as well as the first area 71 and the third area 73 are directly next to each other. Therefore, the boundaries between these areas more moderately reflect the light having the resonance wavelength back into the first area 71. Thus, the light-confining effect in the anti-plane direction of the resonator 76 formed between the second area 72 and the third area 73 is improved.

Figure 9:
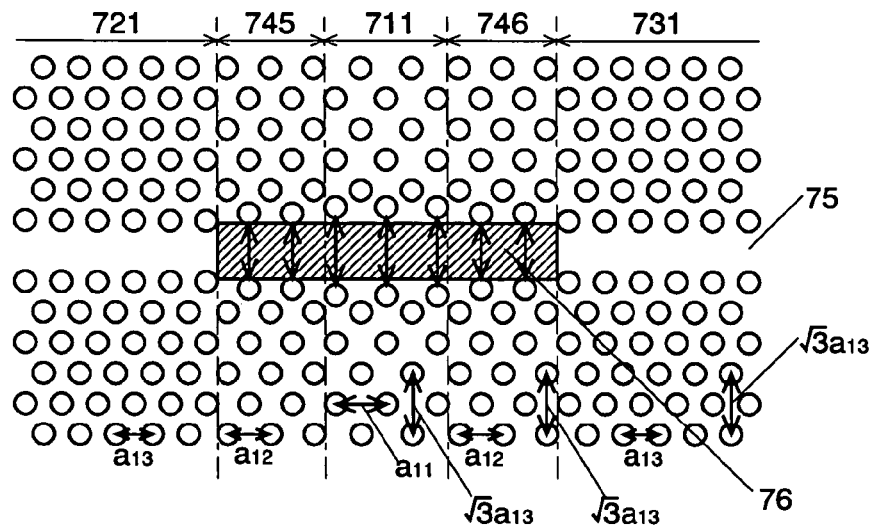
FIG. 9 includes plan views of two-dimensional photonic crystal resonators having multi-stage structures, where (a) shows an embodiment in which the cycle distance of the holes in the direction perpendicular to the waveguide is uniform among all the areas, and (b) shows an embodiment in which the width of the waveguide is also uniform among all the areas.
Figure 9:
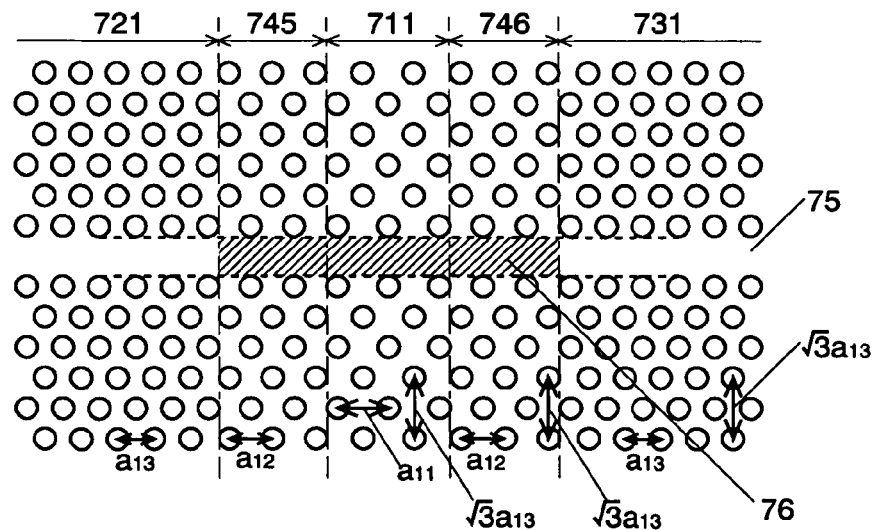

Also for such a multi-stage structure, it is preferable to equalize the cycle distance in the direction perpendicular to the waveguide among all the areas. Furthermore, in the present case, it is desirable to equalize the width of the waveguide among all the areas. FIG. 9 shows an example, in which the first area 711 having an arrangement cycle distance of $a_{11}$ of the holes 22 in the direction parallel to the waveguide 75 is formed between the second area 721 and the third area 731 both having a cycle distance of $a_{13}$ in the aforementioned direction. Furthermore, the fourth area 745 and the fifth area 746 both having a cycle distance of $a_{12}$ in the aforementioned direction are formed between the first area 711 and the second area 721 and between the first area 711 and the third area 731. In any area, the cycle distance of the holes in the direction perpendicular to the waveguide 75 (i.e. the distance between the two lines of the holes) is equal: $3^{0.5}a_{13}$. The width of the waveguide 75 was $3^{0.5}a_x - b$ in each area ($a_x$ is the cycle distance of the area in the direction parallel to the waveguide 75) in (a), and $3^{0.5}a_{13} - b$ in all the areas in (b).

Regarding FIGS. 9(a) and (b), Q-value was calculated using the parametric values: $a_{11} = 420$ nm, $a_{12} = 415$ nm, $a_{13} = 410$ nm. The parametric values relating to the first through third areas are the same as used in FIG. 7. The results were Q=5,500,000 for (a) and Q=11,000,000 for (b). These values are better than those obtained in the case of FIG. 7. This means that the Q-value can be improved by the multi-stage structure. Also, the fact that the Q-value for (b) is larger than that for (a) suggests that it is preferable to equalize the width of the waveguide among all the areas.

Figure 10:
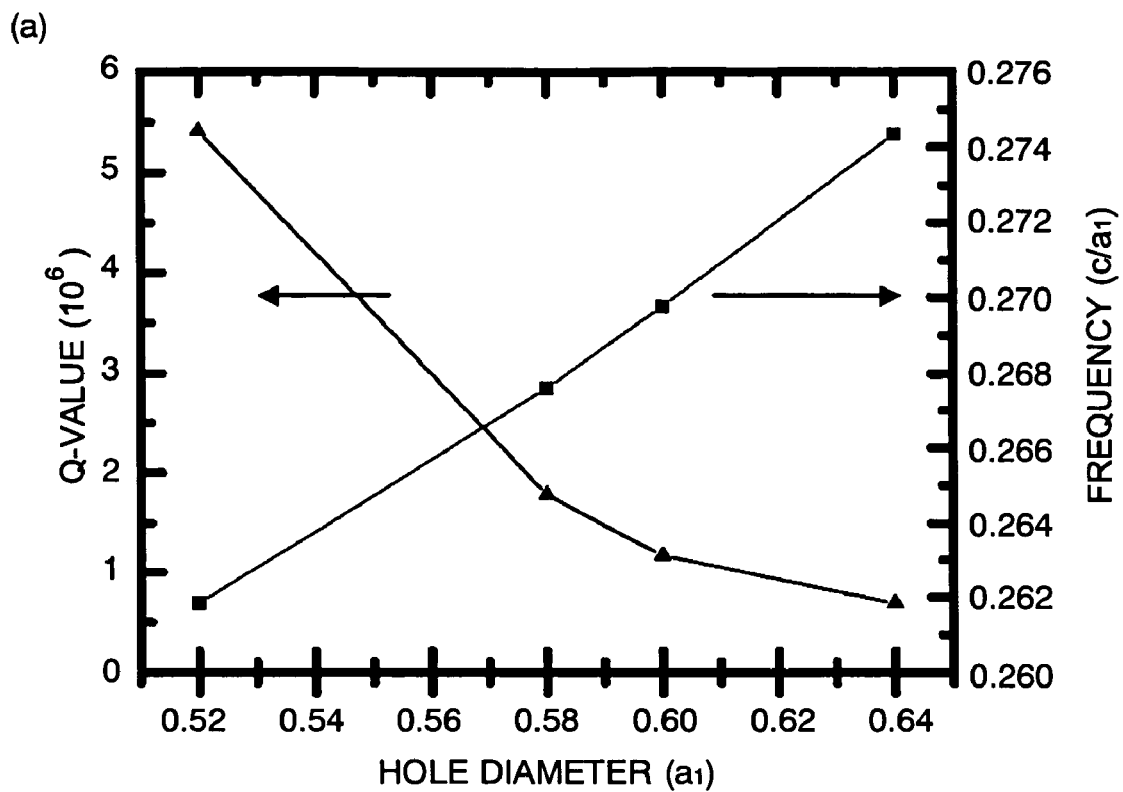
FIG. 10 includes graphs showing the frequency, the Q-value and the separation width from the guided mode of the structure shown in FIG. 6, all changing with the size of the holes.
Figure 10:
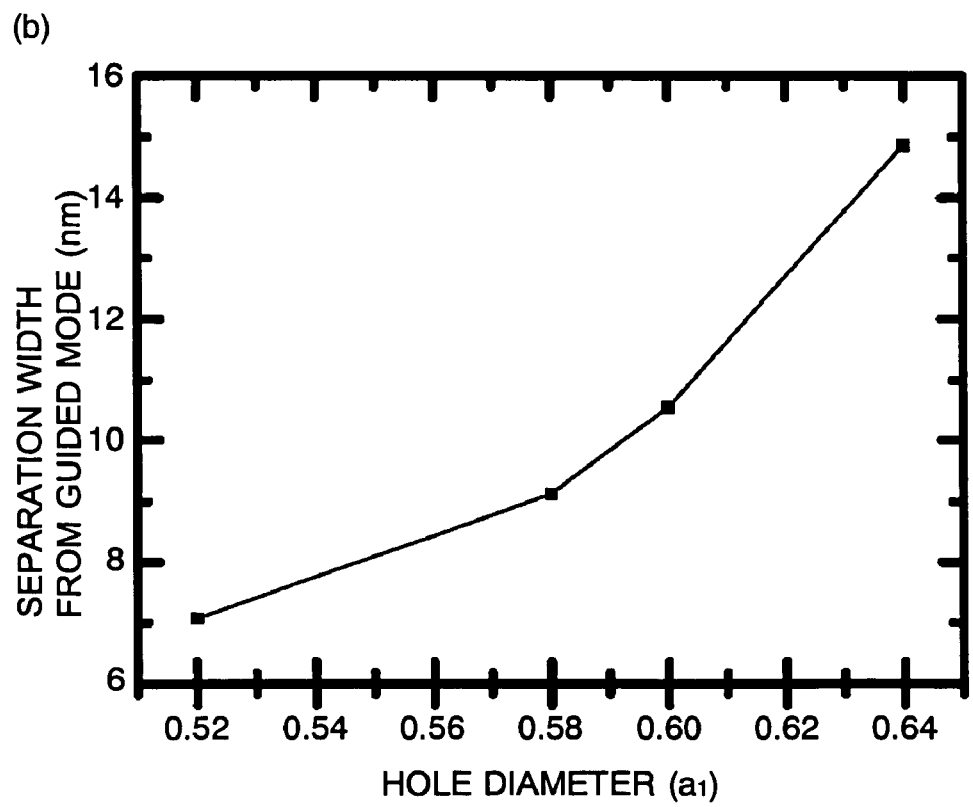

In the examples described thus far, the resonators are formed within the waveguide by controlling the transmission wavelength band through the cycle distance of the holes. It is also possible to additionally control the hole diameter. FIG. 10 shows the results of calculations of the changes in the frequency (or wavelength), the Q-value and the separation width of the guided mode to be observed when the diameter is varied in all the areas of the structure shown in FIG. 6. The hole diameter (indicated by the abscissa) is expressed by the ratio to cycle distance of $a_1$ of the holes in the first area. The "separation width of the guided mode" is defined as the difference between the resonance wavelength and the wavelength closest to the resonance wavelength within the transmission wavelength band of either the second area or the third area. As shown in FIG. 10(a), the resonance frequency changes according to the hole diameter. The Q-value increases as the hole diameter decreases, which means that the diameter of the holes should be smaller as far as the Q-value is concerned. The separation width of the guided mode, however, becomes larger as the hole diameter becomes larger. It is preferable to make the resonance wavelength distant from the transmission wavelength bands of the second area and the third area. From this viewpoint, the hole diameter should be larger. Thus, the hole diameter should be appropriately determined taking into account both the Q-value and the separation width of the guided mode.

Figure 11:
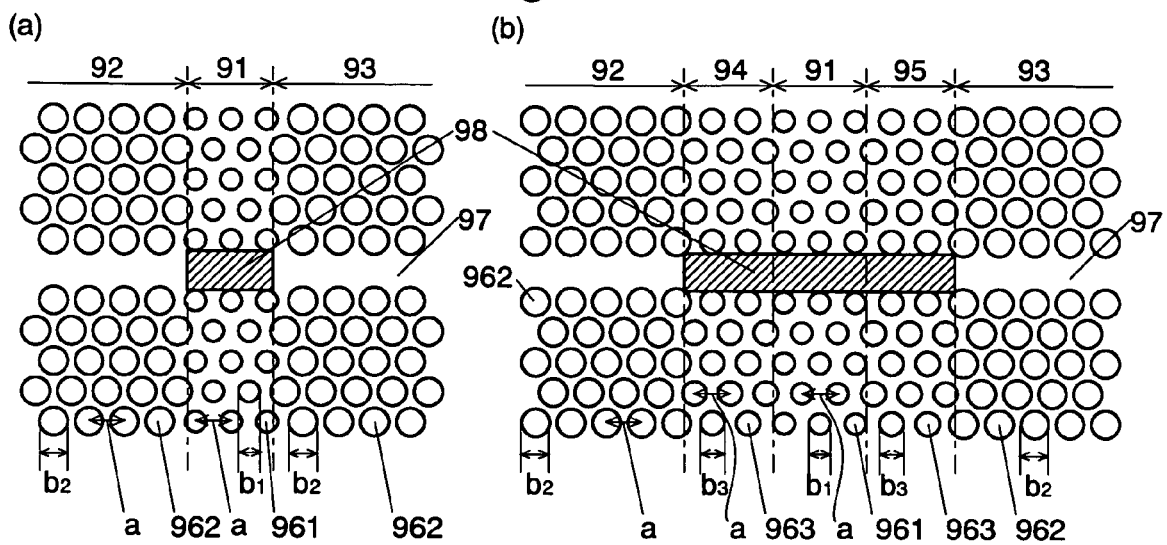
FIG. 11 includes plan views showing embodiments of the two-dimensional photonic crystal resonator in which the diameter of the holes in each area is not equalized.

It is also possible to vary only the size of the holes for each area, maintaining the cycle distance of the holes equalized among all the areas. FIG. 11 shows examples of such two-dimensional photonic crystals. In (a), the first area 91 has holes 961 with a diameter of $b_1$ arranged in a triangular lattice pattern with a cycle distance of a. Located on both sides of the first area 91 are the second area 92 and the third area 93, both having holes 962 with a diameter of $b_2$ ($>b_1$) arranged in a triangular lattice pattern with the same cycle distance of a. In (b), the fourth area 94 and the fifth area 95, both having holes 963 with a diameter of $b_3$ larger than $b_1$ and smaller than $b_2$ arranged in a triangular lattice pattern with the same cycle distance of a as used in the other areas, are located between the first area 91 and the second area 92 as well as between the first area 91 and the third area 93, respectively. In any of these cases, the waveguide 97 is formed to pass through all the areas, as in the foregoing embodiments. Thus, in both cases of (a) and (b), a resonator 98 is formed in the waveguide 97 between the second area 92 and the third area 93. In the present embodiment, the holes closest to the waveguide are located on the lattice points of the triangular lattice pattern. Therefore, the variance in the diameter of the holes among the areas makes the width of the waveguide in the first area larger than in the other areas. It is also possible to modify the position of the holes closest to the waveguide and thereby regulate the width of the waveguide to determine the Q-value and other parameters.

A decrease in the hole diameter will shift the resonance wavelength band toward the long wavelength side, as shown in FIG. 1(a). Therefore, a resonance wavelength band is formed on the long wavelength side of the wavelength transmission waveguide band of the first area 91. Thus, the waveguide within the first area functions as a resonator, as in the foregoing embodiments. Also, the multi-stage structure shown in (b) yields the same effect as in the case of FIG. 8.

For the construction shown in FIG. 11(a), calculations have been conducted, letting $b_2=0.62a$, under each of the following conditions: (i) $b_1=0.54a$ and (ii) $b_1=0.58a$. The results confirmed that the waveguide in the first area functions as a resonator in both cases. The obtained values were: (a) resonance frequency=0.266c/a, Q-value=34,000 and separation width of guided mode=20 nm (for a=420 nm); and (b) resonance frequency=0.267c/a, Q-value=76,000 and separation width of guided mode=13 nm (for a=420 nm).

The following description shows embodiments of the multiplexer/demultiplexer using the two-dimensional photonic crystal resonator according to the present invention.

Figure 12:
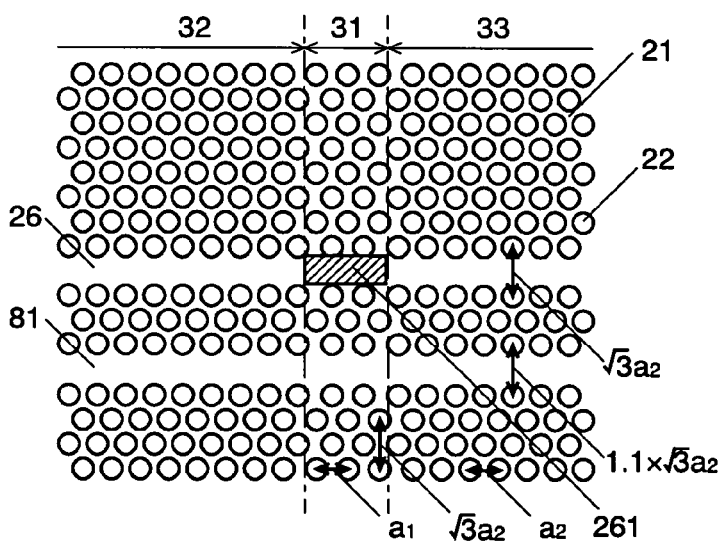
FIG. 12 is a plan view of an embodiment of the two-dimensional photonic crystal multiplexer/demultiplexer according to the present invention.

FIG. 12 shows an example in which the two-dimensional photonic crystal resonator shown in FIG. 6 is modified to include an input/output waveguide 81 formed by eliminating holes 22 lying on a single line of the triangular lattice pattern at a distance of three lines of holes from the resonator. In this example, the holes 22 located in opposition to the waveguide 26 across the input/output waveguide 81 have been shifted to come farther from the input/output waveguide 81 so that the width of the input/output waveguide 81 is widened to 1.1 times that of the waveguide 26. This is to include the resonance wavelength into the waveguide transmission wavelength band of the input/output waveguide 81. Since, in the case of FIG. 12, the cycle distance of the holes of every area is made equal in the direction perpendicular to the waveguide 26 using the structure as shown in FIG. 6, the input/output waveguides 81 are connected smoothly on the boundaries of the areas. The construction shown in FIG. 12 functions as a demultiplexer in which the resonator extracts light having the resonance wavelength of the resonator 261 from the superimposed light propagating through the input/output waveguide 81 and emits the extracted light to the outside of the crystal, and as a multiplexer in which the resonator introduces light having the resonance wavelength of the resonator 261 from the outside of the crystal into the input/output waveguide 81.

Figure 13:
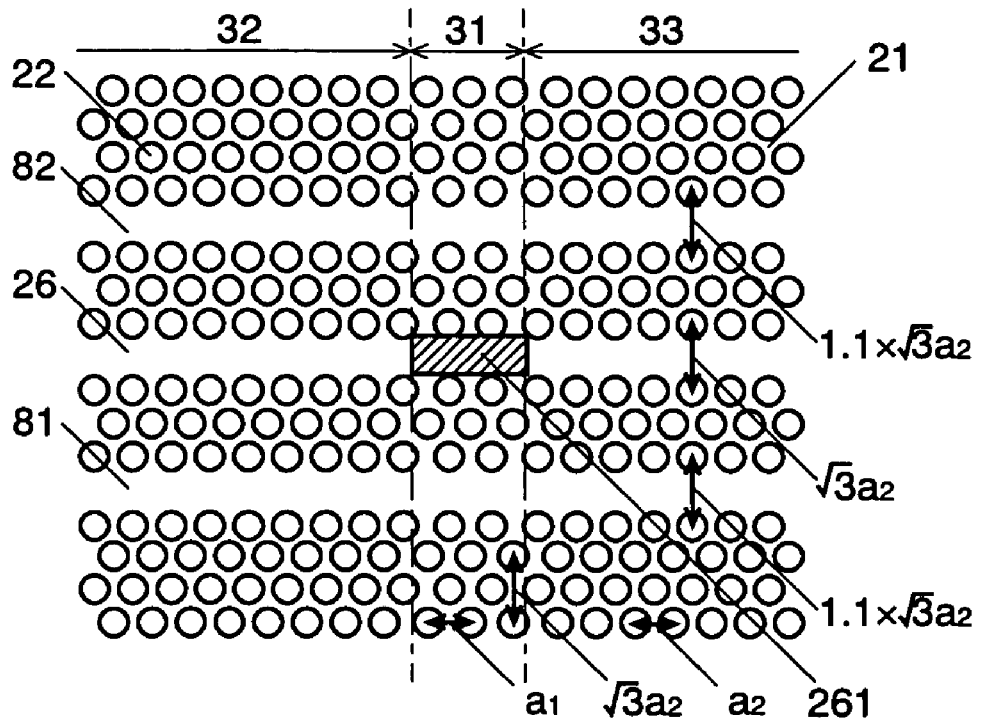
FIG. 13 is a plan view of an embodiment of the two-dimensional photonic crystal multiplexer/demultiplexer according to the present invention.

FIG. 13 shows an example in which two input/output waveguides 81 and 82 are separately formed across the waveguide 26. When a superimposed ray of light is propagated through the input/output waveguide 81, this construction functions as a demultiplexer for extracting light having the resonance wavelength of the resonator 261 from the input/output waveguide 81 into the input/output waveguide 82, and as a multiplexer for introducing the same light from the input/output waveguide 82 into the input/output waveguide 81.

Figure 14:
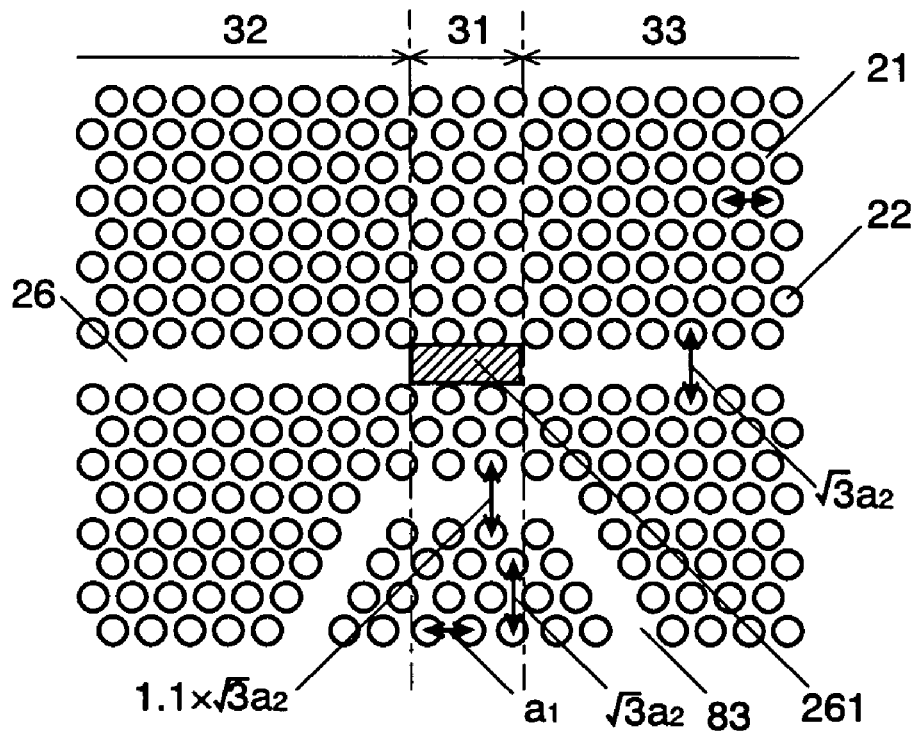
FIG. 14 is a plan view of an embodiment of the two-dimensional photonic crystal multiplexer/demultiplexer according to the present invention.

FIG. 14 shows an example in which the input/output waveguide 83 is bent so that the displacement of the input/output waveguide 83 from the waveguide 26 increases as the distance from the resonator 261 increases. This construction facilitates the extraction or introduction of the light having the resonance wavelength of the resonator 261 between the resonator 261 and the input/output waveguide 83 while impeding the input/output of rays of light having wavelengths different from the resonance wavelength between the waveguide 26 and the input/output waveguide 83 in the other areas.

The invention claimed is:

1. A two-dimensional photonic crystal resonator, which is characterized in that it comprises:

a) a first area consisting of a two-dimensional photonic crystal having a first cycle distance;

b) a second area and a third area, each being located adjacent to the first area and consisting of a two-dimensional photonic crystal, which have a second cycle distance and a third cycle distance, respectively, that are different from the first cycle distance; and c) a waveguide passing through the second area, the first area and the third area in this order, where the cycle distance is defined by a distance between nearest neighboring modified refractive index areas in the direction parallel to the waveguide, and light present within the first area is reflected by boundaries with the second area and the third area and made to resonate.

2. The two-dimensional photonic crystal resonator according to claim 1, which is characterized in that the second cycle distance equals the third cycle distance.

3. The two-dimensional photonic crystal resonator according to claim 1, which is characterized in that one or more areas whose cycle distance is between the first cycle distance and the second cycle distance are located between the first area and the second area, and another one or more areas whose cycle distance is between the first cycle distance and the third cycle distance are located between the first area and the third area.

4. The two-dimensional photonic crystal resonator according to claim 1, which is characterized in that the first cycle distance is larger than the other cycle distance or cycle distances.

5. The two-dimensional photonic crystal resonator according to claim 4, which is characterized in that the difference between the first cycle distance and the other cycle distance or cycle distances is within 0.1 to 10% of the first cycle distance.

6. The two-dimensional photonic crystal resonator according to claim 1, which is characterized in that the cycle distance of the first area in a direction parallel to the waveguide differs from that of the other area or areas, whereas the cycle distance of the first area in a direction perpendicular to the waveguide equals that of the other area or areas.

7. The two-dimensional photonic crystal resonator according to claim 6, which is characterized in that the width of the waveguide in the first area equals that in the other area or areas.

8. The two-dimensional photonic crystal resonator according to one of claims 1-3 and 4-7, which is characterized in that the cycle distance of each area is formed by cyclically arranging holes in a slab-shaped body and the waveguide is formed by linearly eliminating the holes.

9. The two-dimensional photonic crystal resonator according to claim 1, which is characterized in that a luminescent medium is contained in an area including at least the waveguide of the first area.

10. A two-dimensional photonic crystal multiplexer/demultiplexer, which is characterized in that it comprises an additional waveguide located in proximity to the waveguide of the first area of the two-dimensional photonic crystal resonator according to claim 1.

* * * * *